United States Patent
Stanich et al.

(10) Patent No.: US 7,733,533 B2
(45) Date of Patent: Jun. 8, 2010

(54) GENERATING THRESHOLD VALUES IN A DITHER MATRIX

(75) Inventors: Mikel John Stanich, Longmont, CO (US); Chai Wah Wu, Poughquag, NY (US); Gerhard Robert Thompson, Wappingers Falls, NY (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1097 days.

(21) Appl. No.: 11/278,939

(22) Filed: Apr. 6, 2006

(65) Prior Publication Data

US 2007/0236743 A1 Oct. 11, 2007

(51) Int. Cl.
*G06K 15/00* (2006.01)
*H04N 1/46* (2006.01)
(52) U.S. Cl. ............... 358/3.13; 358/3.18; 358/3.14
(58) Field of Classification Search ........... 358/1.9, 358/3.13, 2.7, 3.14
See application file for complete search history.

(56) References Cited

U.S. PATENT DOCUMENTS

| | | | |
|---|---|---|---|
| 5,111,310 A | | 5/1992 | Parker et al. |
| 5,526,021 A | * | 6/1996 | Naylor, Jr. .............. 715/804 |
| 5,726,772 A | | 3/1998 | Parker et al. |
| 5,917,951 A | | 6/1999 | Thompson et al. |
| 5,992,751 A | * | 11/1999 | Laser .................. 235/472.01 |
| 6,025,930 A | | 2/2000 | Thompson et al. |
| 6,356,363 B1 | * | 3/2002 | Cooper et al. .............. 358/1.9 |
| 6,433,891 B1 | | 8/2002 | Yu et al. |
| 6,597,813 B1 | | 7/2003 | Stanich et al. |
| 7,085,015 B2 | * | 8/2006 | Bhattacharjya ........... 358/3.08 |
| 2002/0196469 A1 | | 12/2002 | Yao |
| 2003/0035146 A1 | | 2/2003 | Yu et al. |
| 2003/0107753 A1 | * | 6/2003 | Sakamoto ................. 358/1.9 |

(Continued)

OTHER PUBLICATIONS

Wu et al., "Supercell Dither Masks with Constrained Blue Noise Interpolation", NIP17:International Conference on Digital Printing Technologies, Oct. 2001, pp. 487-490.

(Continued)

*Primary Examiner*—Twyler L Haskins
*Assistant Examiner*—David L Suazo
(74) *Attorney, Agent, or Firm*—Blakely, Sokoloff, Taylor & Zafman LLP

(57) ABSTRACT

Provided are a method, system, and program for generating threshold values in a dither matrix. A dither matrix of threshold values is generated. The threshold values in the dither matrix are filtered to generate a filtered dither matrix of filtered dither values by performing for dither values in the dither matrix: determining a region of dither values in the dither matrix that surrounds the value being considered, wherein the dither values in the determined region comprise one of dither values in a first portion of the region within the dither matrix or a wrap around dither value in a second portion of the region that extends beyond the dither matrix; and using an offset value to determine one wrap around dither value, wherein repeated instances of the dither matrix are designed to be applied to an image by forming a tile pattern of the repeated instances of the matrix over the image pattern, and wherein the repeated instances of the matrix in the tile pattern are offset in one direction by the offset value; and performing an operation on the determined dither values in the region to determine a filtered value for the dither value being considered.

20 Claims, 6 Drawing Sheets

U.S. PATENT DOCUMENTS

2003/0169441 A1    9/2003   Garcia et al.
2005/0195441 A1*   9/2005   Inoue et al. ................ 358/3.14
2009/0016442 A1*   1/2009   Shankar et al. ........ 375/240.24

OTHER PUBLICATIONS

Mitsa et al., "Digital Halftoning Using a Blue Noise Mask", IEEE, 1991, pp. 2809-2812.

Martins et al., "Halftone Coding with JBIG2", Journal of Electronic Imaging, Jan. 2000, vol. 9(1), pp. 52-60.

Lau, et al., "Blue-and Green- Noise Halftoning Models", IEEE Signal Processing Magazine, Jul. 2003, pp. 28-38.

Wu et al., A Unified Framework for Digital Halftoning and Dither Mask Construction: Variations on a Theme and Implementation Issues, IBM Research Report, RC22849 (W0305-137) May 2003.

Todd, "Dot Modelling For Printing Grey Scale Images", IBM Corporation, Technical Disclosure Bulletin, vol. 33, No. 12, May 1991, pp. 4470449.

Cheung, "Low-memory Low-complexity Inverse Dithering", Proceedings of the International Society for Optical Engineering Conference, vol. 3649, 1998, pp. 529-540.

* cited by examiner

111
GENERATING THRESHOLD VALUES IN A DITHER MATRIX

BACKGROUND OF THE INVENTION

1. Field of the Invention

The present invention relates to a method, system, and program for generating threshold values in a dither matrix.

2. Description of the Related Art

Most printers today can print in only a limited number of colors. Digital halftoning is a technique for printing a picture (or more generally displaying it on some two-dimensional medium) using small dots of a limited number of colors such that it appears to consist of many colors or shades of grey when viewed from a proper distance. For example, a picture of black and white dots can appear to display grey levels when viewed from some distance.

A popular method for digital halftoning is accomplished using a dithering algorithm which generates a dither mask or array having threshold values. The pixel values in the image comprise one of many greyscale or color values. Each pixel value is compared to a corresponding threshold value in the dither mask to determine whether the halftone output for that pixel is "on" (i.e. a dot will be printed at that pixel, and this can be represented numerically as the halftone pixel having a value 1) or "off" (i.e. a dot will not be printed at that pixel, represented numerically as the halftone pixel with value 0). Dither arrays use periodic patterns of threshold values which can have an unpleasant rendering at certain gray levels.

Too much randomness in the design of a dither array blurs the image and yields unaesthetic results. Techniques have been developed to increase the effect of blue noise with low frequencies attenuated to improve the visual effect of the image, such as that described in U.S. Pat. Ser. No. 5,726,772. In halftoning, blue noise is the statistical model describing the ideal spatial and spectral characteristics of aperiodic dispersed-dot dither patterns to attempt to produce stochastic dither patterns of the same-sized dots distributed as homogeneously as possible. Stochastic or blue noise patterns have also been used to improve clustered periodic dither mask as described in U.S. Pat. Ser. No. 6,025,930.

A step in typical methods to generate a dither mask that increases the desirable effect of blue noise is the filtering operation, where the values in the dither mask or a halftone pattern obtained from a dither mask may be filtered, such that each pixel value in the array is calculated as a weighed average of values that surround the subject pixel value, as described in C. W. Wu, G. Thompson, M. Stanich, "A unified framework for digital halftoning and dither mask construction: variations on a theme and implementation issues (Focal Paper)," NIP 19: IS&T's International Conference on Digital Printing Technologies, New Orleans, La., 2003, pp. 793-796. As described in this paper, many algorithms for generating dither masks have this filtering operation in common. The rest of the algorithm can be different depending on the algorithm and the application. Since the image to be halftoned is generally much larger than the dither mask, FIG. 1 illustrates how, in the prior art, repeated instances of a dithering mask 2a, 2b, 2c, 2d are arranged in a tile pattern superimposed over an image to provide threshold values for the pixel values in the image to determine the output for the pixel values in the image. A filter region 4 is used to determine surrounding threshold values to a center pixel value, e.g., "88" in mask 2a that falls within the filter region 4, such that a weighted average of the surrounding values of "88" as defined in the filter region 4 are calculated to produce filtered threshold values for a filtered dither mask. If the filter region 4 extends beyond the mask 2a including the threshold pixel whose filtered value being calculated, then the threshold value outside of the region of the matrix wraps around to the other side of the matrix. For instance, the surrounding value in the filter region 4 below the cell having value "97" wraps around to the other side to provide the threshold value "17", which I shown in the instance of the dither mask 2c. These surrounding values in the portion of the filter region 4 that extend beyond the mask 2a are referred to as "wrap around values".

In prior art methods for generating stochastic or blue noise masks, the dither mask is tiled as shown in FIG. 1, i.e. the dither masks are arranged with the edges aligned with each other. This condition is especially necessary in implementations where a Fourier transform based method is used to perform the filtering or convolution operation. In this case, the wrap around corresponds to circular convolution which can be easily implemented in a computer algorithm using the Fast Fourier Transform.

There is a need in the art for improved techniques for generating and filtering dither masks to improve the visual effects of a printed or displayed image.

SUMMARY

Provided are a method, system, and program for generating threshold values in a dither matrix. A dither matrix of threshold values is generated. The threshold values in the dither matrix are filtered to generate a filtered dither matrix of filtered dither values by performing for dither values in the dither matrix: determining a region of dither values in the dither matrix that surrounds the value being considered, wherein the dither values in the determined region comprise one of dither values in a first portion of the region within the dither matrix or a wrap around dither value in a second portion of the region that extends beyond the dither matrix; and using an offset value to determine one wrap around dither value, wherein repeated instances of the dither matrix are designed to be applied to an image by forming a tile pattern of the repeated instances of the matrix over the image pattern, and wherein the repeated instances of the matrix in the tile pattern are offset in one direction by the offset value; and performing an operation on the determined dither values in the region to determine a filtered value for the dither value being considered.

BRIEF DESCRIPTION OF THE DRAWINGS

Figure 1:
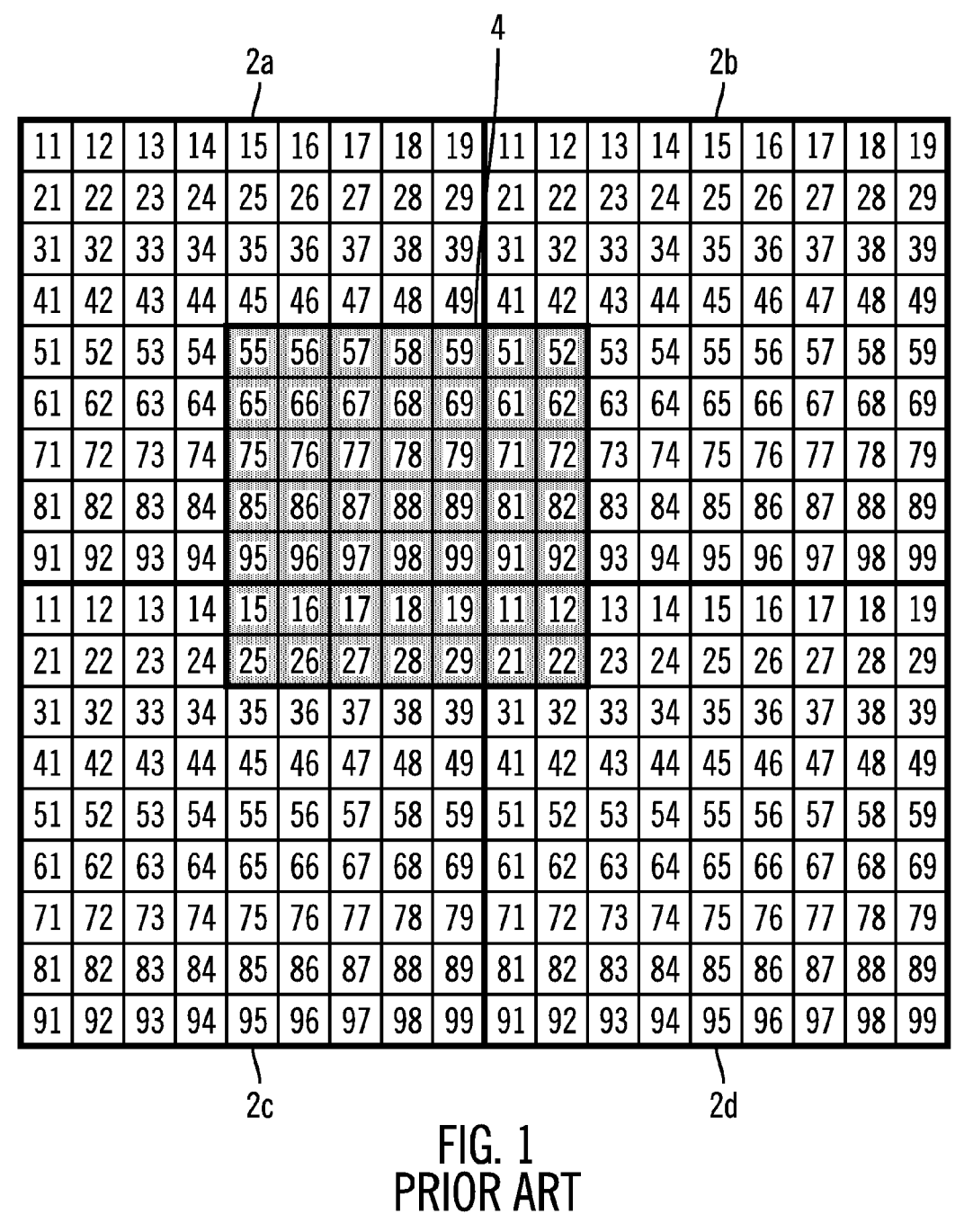

FIG. 1 illustrates a prior art representation of a filter region applied to a dither matrix.

FIG. 5 illustrates a representation of a filter region applied to a dither matrix that is tiled with offsets.

DETAILED DESCRIPTION

Figure 2:
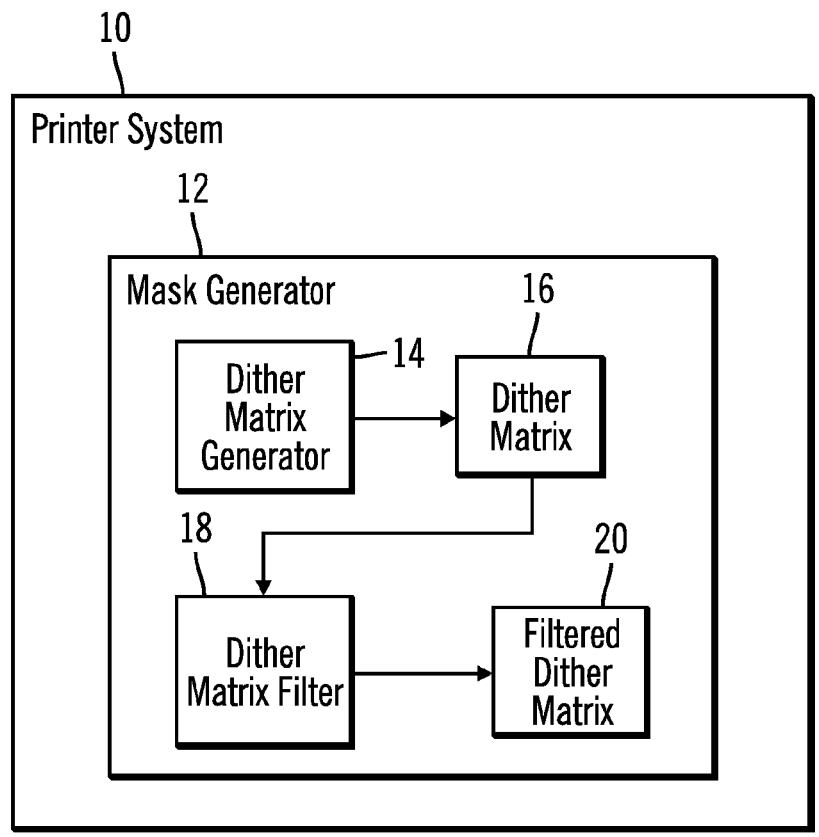
FIG. 2 illustrates an embodiment of a printer system.

FIG. 2 illustrates an embodiment of a printer system 10 that may be used to generate a filtered dither mask that is encoded in printer hardware or software that is supplied to customers to use to apply to images being displayed or printed. The printer system 10 includes a mask generator 12 including components to generate a filtered dither mask, including a dither mask generator 14 to generate a dither matrix 16 that includes threshold values to improve image output (e.g., print, display) quality, which may utilize image enhancement algorithms known in the art. A dither matrix may also be referred to as a dither array or dither mask. A dither matrix filter 18 filters the values in the generated dither mask 16 to produce a filtered dither matrix 20. The dither matrix filter 18 may perform an operation on pixels surrounding a pixel in the dither matrix 16 to determine a filtered value for the value in the dither matrix 16 for the filtered dither matrix 20. The mask generator 12 may be implemented as a computer program loaded into a system memory and executed by a processor. Alternatively, the mask generator 12 may be implemented in hardware logic, such as an application specific integrated circuit (ASIC). Still further, the mask generator 12 components may be implemented in a combination of hardware and software.

Figure 3:
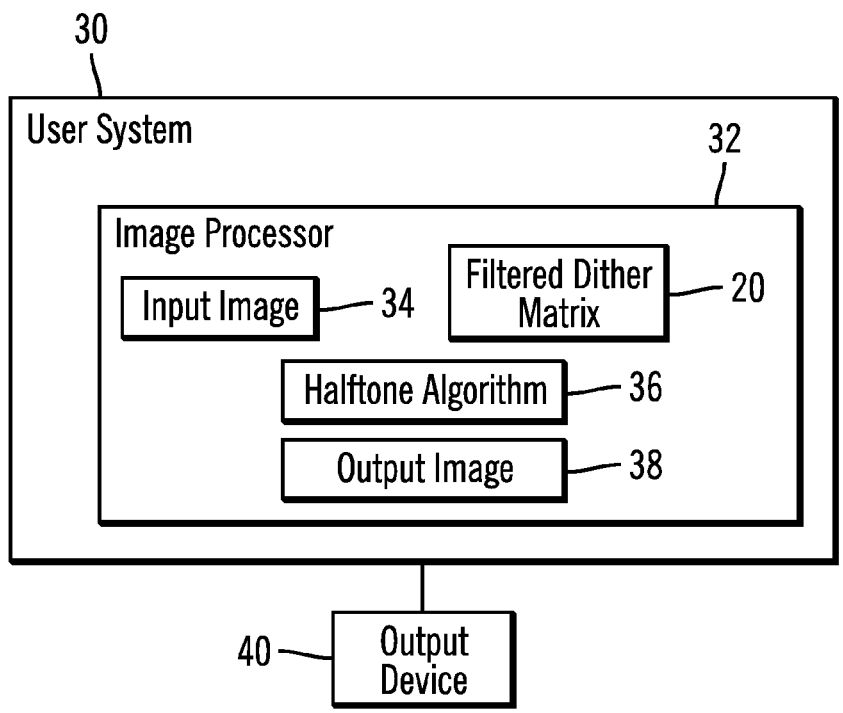
FIG. 3 illustrates an embodiment of a user system.

FIG. 3 illustrates an embodiment of a user system 30 that utilizes the generated filtered dither matrix 20 to apply to an input image 32 to enhance the outputted image quality. The user system 30 includes an image processor 34 component that includes a halftone algorithm 36 receives the input image 32 and the filter dither matrix 20. The halftone algorithm 26 tiles instances of the filter dither matrix 20 over the input image 32 so that the tiled instances of the filtered dither matrix 20 provide threshold values for each pixel in the input image 32. The threshold value for a corresponding pixel is used to determine the output for that pixel, e.g., on or off. An output image 38 comprises the pixel values determined by applying the tiled instances of the dither matrix 20 to the input image 34. The output image 38 is transmitted to an output device 40, such as a printer, display device or storage device, to render.

The image processor 32 components may be implemented as a computer program loaded into a system memory and executed by a processor. Alternatively, the image processor 32 may be implemented in hardware logic, such as an ASIC. Still further, the image processor 32 may be implemented in a combination of hardware and software. The image processor 32 may be implemented in the user system 30 or in the output device 40.

In the embodiment of FIGS. 2 and 3, the mask generator 12 and image processor 32 are shown as part of separate printer developer 10 and user 30 systems. In such case, the filtered dither matrix 20 is included with the printer software or hardware supplied to the user. In an alternative embodiment, the user system 30 or output device 40 may include the mask generator 12 to generate a filtered dither matrix 20 as part of the print operations to use for a specific print job. In this way, the user system 30 may generate the filtered dither matrix 20 "on the fly" to use for a particular print job.

Figure 4:
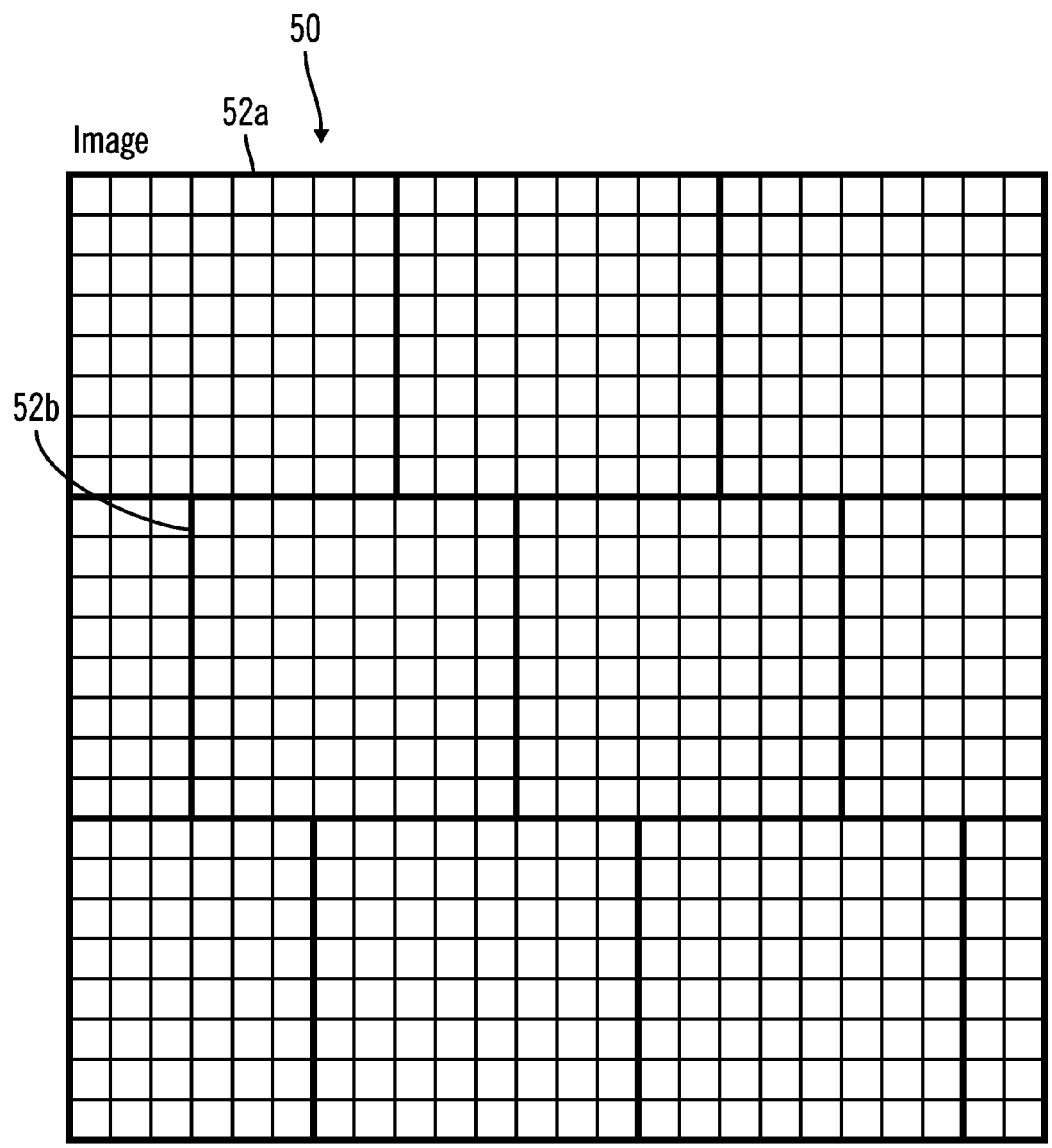
FIG. 4 illustrates an embodiment of how instances of a dither matrix may be superimposed over an image in a tile arrangement with offsets

FIG. 4 illustrates how instances of a dither matrix may be tiled over an image 50 to provide the threshold values to use to compare against the image pixels. In the embodiment of FIG. 4, the instances 52a, 52b of a dither matrix, e.g., 20, are arranged at an offset in the horizontal direction. For instance, dither matrix instance 52a is arranged at an offset of three pixels from the instance of dither matrix 52b. This offset appears throughout the tile pattern. It has been observed that tiling the matrices at an offset to one another in one direction can result in stochastic dither masks which improves the visual quality of the image. This is because the addition of an offset adds additional flexibility and degrees of freedom in how the dither mask is generated. Furthermore, without offset, the tiling of the dither masks generates a periodicity which is aligned in the vertical and horizontal direction (i.e. periodicity at 90 degrees angles), which is more visible to the eye. With the offset, the tiling generates periodicity in other angles which can be less visible to the eye. Described embodiments tile dither masks with an offset to generate blue noise dither masks, dither masks with blue noise interpolation or any other dither masks with a stochastic component. In one embodiment, the offset value may comprise approximately one half the length or number of rows (n) of the matrix. Any positive or negative offset may be used to produce specific screen angles for clustered dot halftone designs utilizing blue noise interpolation.

Figure 5:
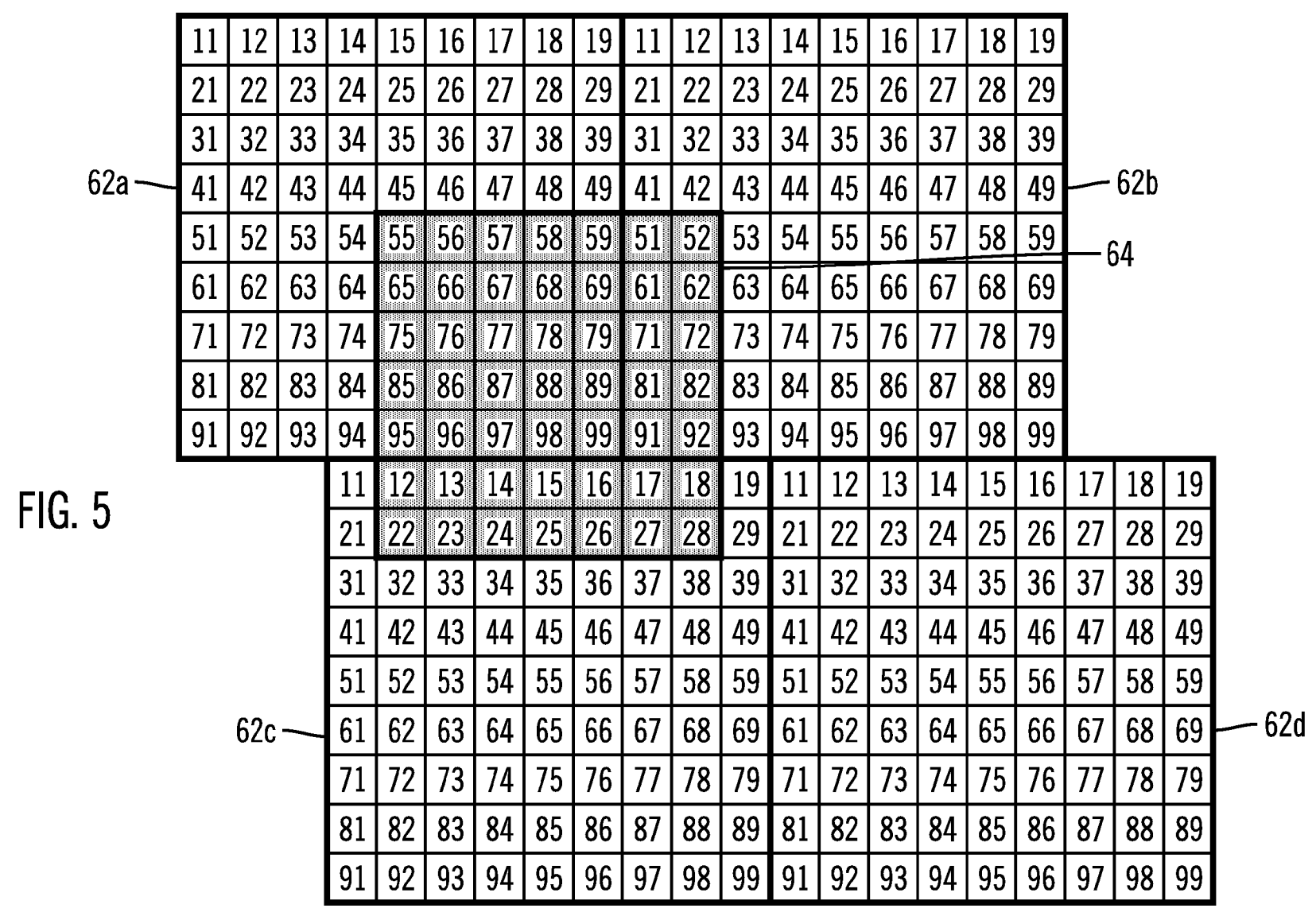

FIG. 5 illustrates an embodiment of how a filter region 64 is applied to dither matrix instance 62a to determine surrounding values that are then operated upon to calculate a replacement value for the surrounded matrix value "88", which in this embodiment is in the middle of the filter 64 region. The described embodiments provide techniques for determining wrap around values for cells in the filter 64 region to use to calculate the filtered dither matrix pixel value. In the embodiment of FIG. 5, the filter region forms a square to provide surrounding values used to calculate a filtered threshold value for the dither value at the center of the square filter region 64. In alternative embodiments, the filter region 64 may form different geometrical shapes.

Figure 6:
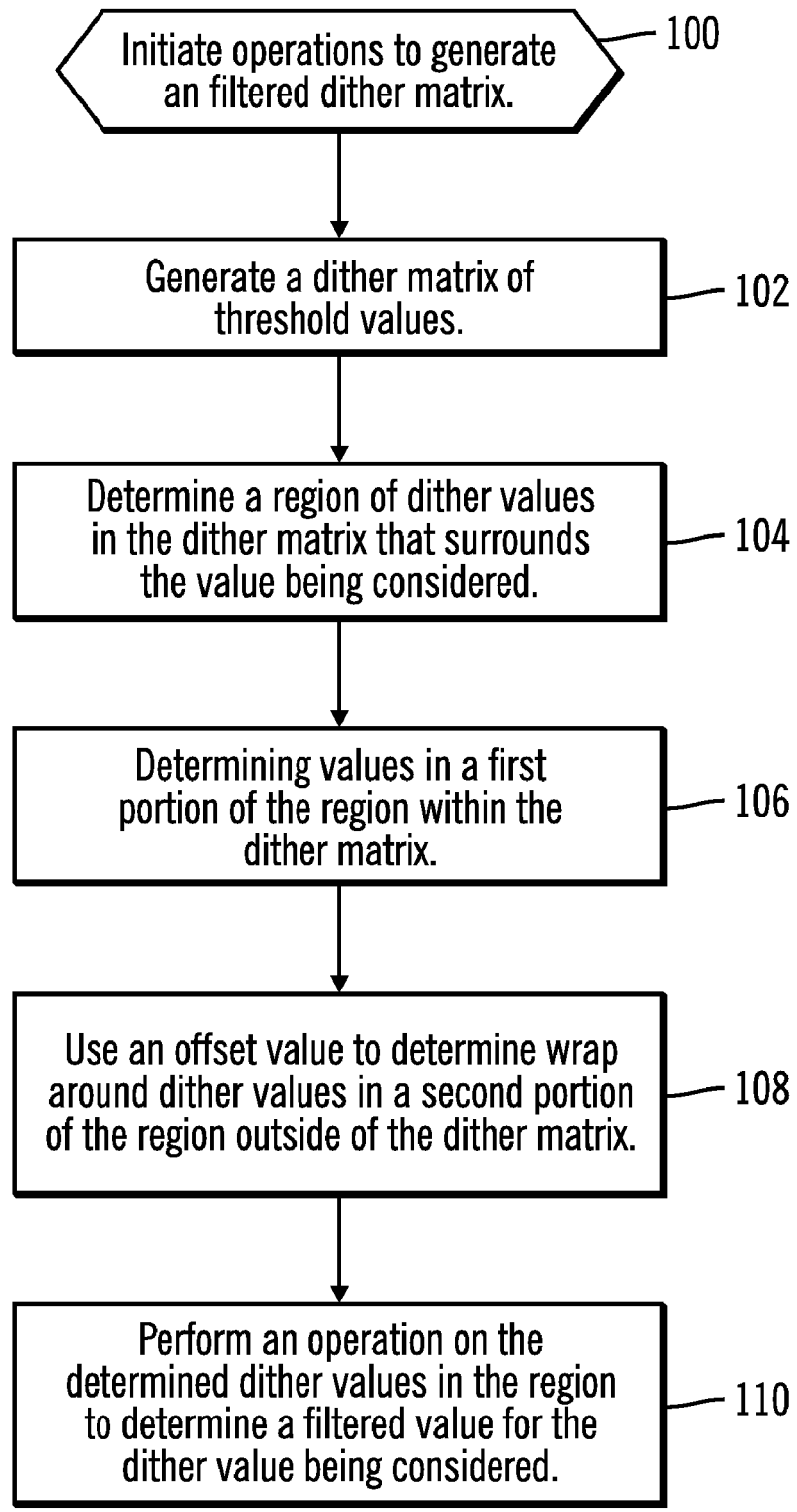
FIG. 6 illustrates an embodiment of operations performed to filter a dither matrix.

FIG. 6 illustrates an embodiment of operations to generate a filtered dither matrix 20. Upon invoking (at block 100) the operations, the dither matrix generator 14 generates (at block 102) a dither matrix 16 of threshold values that is used to enhance image quality when tiled over an image, such as a dither matrix used to increase blue noise. The dither matrix filter 18 determines (at block 104) a region of dither values in the dither matrix 16 that surrounds the pixel value being considered. The dither matrix filter 18 determines (at block 106) values in a first portion of the region within the dither matrix 16 (i.e., the values in the filter region 64 within the instance of the matrix 62a). An offset value (of the offset between tiled instances of the matrix, such as the offset shown in FIG. 5) is used (at block 108) to determine wrap around dither values in a second portion of the filter region 60 outside of the dither matrix 62a. The dither matrix filter 18 then performs (at block 110) an operation on the determined dither values in the region 64 to determine a filtered value for the dither value being considered. This operation is performed for each dither value in the dither matrix 16 to determine a filtered dither value for each pixel resulting in the filtered dither matrix 20. The operation performed at block 110 on the determined surrounding values in the filter region 60 may comprise a weighted average operation or other operations known in the art to filter values in a dither matrix.

Figure 7:
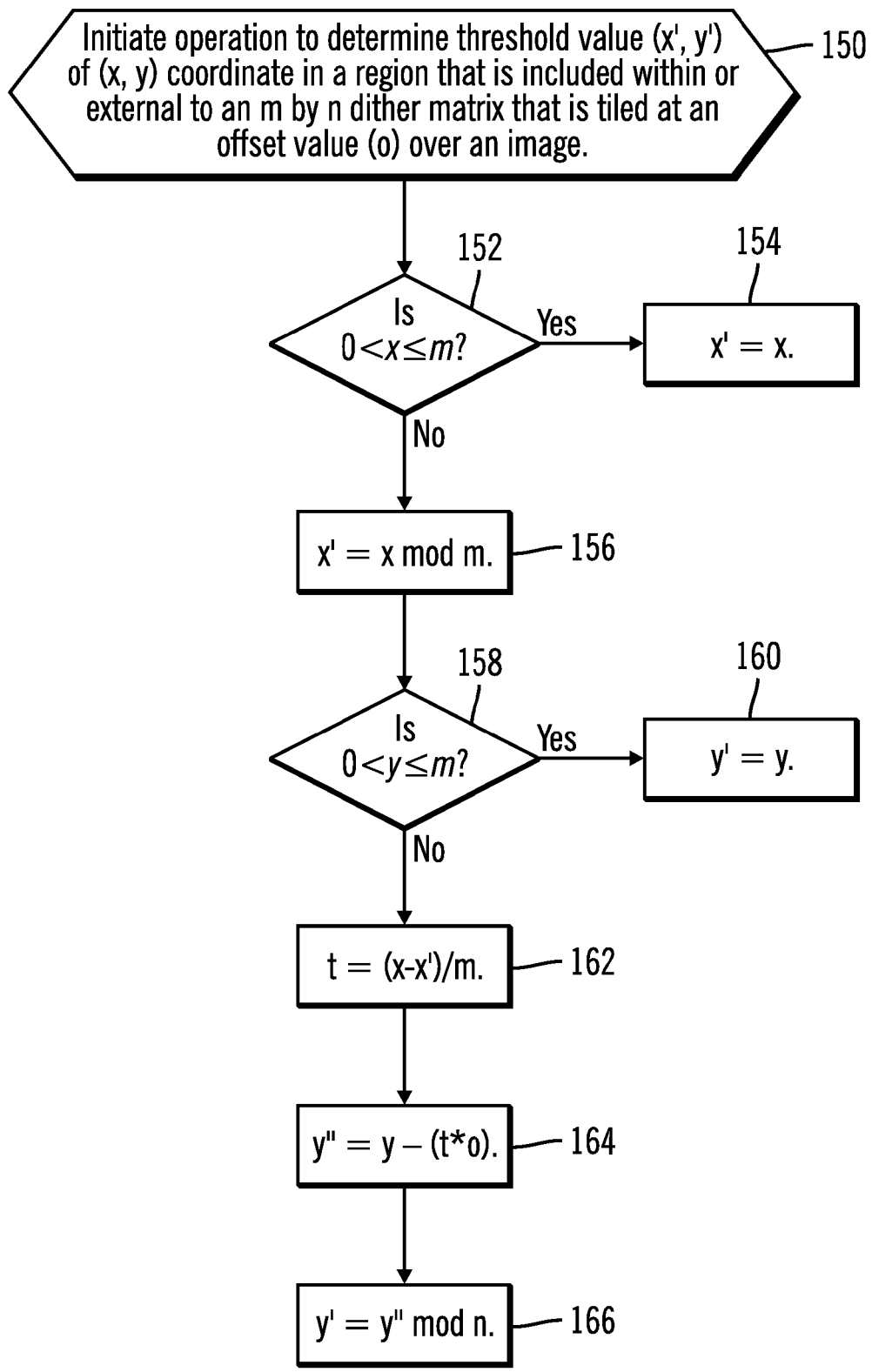
FIG. 7 illustrates an embodiment to determine the threshold values use to calculate a filtered threshold value in a filtered dither matrix.

FIG. 7 illustrates a further embodiment on how to determine wrap around values in the dither matrix 16 and values in the filter region 60 that are within the matrix 62a using the offset of the matrix. The operations of FIG. 7 may be performed by the dither matrix filter 18. In FIG. 7, the coordinate (x, y) comprises a surrounding value in the filter region 60 to use in the calculation, that may comprise coordinate values falling within the m by n dither matrix, i.e., $0<x\leq m$ and/or $0<y\leq n$ or outside of the dither matrix, i.e., $x\leq 0$ and/or $y\leq 0$ and/or $x>m$ and/or $y>n$. A coordinate (x', y') comprises the coordinate of the threshold value within the matrix that can be used as the threshold value for the (x, y) coordinates within the filtered region 60. For coordinates (x, y) in the filter region 60 that are not wrap around values, the coordinates (x', y') in the matrix providing the surrounding is the same as the (x, y) coordinates in the filter region 60 However, for wrap around values, the coordinates (x', y') differ from (x, y).

Control begins at block 150 to initiate the operations to determine threshold value (x', y') coordinates in the matrix 60 for the (x, y) coordinates in the filter regions 60 that are included within or external to an m by n dither matrix whose instances are tiled at an offset value (o) over an image. If (at block 152) the x coordinate in the filter region is within the dither matrix, e.g., 62a, i.e., $0 < x \leq m$, then (at block 154) x=x'. Otherwise, the threshold value for the x coordinate comprises the coordinate x' calculated (at block 156) as x mod m. x mod m is defined as the unique integer z such that $0 < z \leq m$ and |x−z| is divisible by m. If (at block 158) the y coordinate in the filter region 64 is within the dither matrix, e.g., 62a, i.e., $0 < y \leq n$, then (at block 160) y =y'. Otherwise, the threshold value for the y coordinate comprises the value at coordinate y', where y' is calculated by first calculating (at block 162) t as (x−x')/m, calculating (at block 164) y" as y−(t*o) and then calculating (at block 166) y' as y" mod n.

Described embodiments provide techniques to apply a filter region 64 to a dither matrix 16 to determine surrounding threshold values in the dither matrix 16 that are used to determine a filtered dither value in a filtered dither matrix. With the described embodiments, the surrounding values in the filter region 64 that extend beyond the boundaries of the matrix are determined using an offset at which instances 62a ... 62d are arranged in a tiled pattern over the image. Tiling instances 62a ... 62d of the dither matrix provides improvements to the appearance of the image, especially for dither matrices designed to increase the property of blue noise.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the dither matrix is used to enhance the image reproduction by increasing blue noise effects. In additional embodiments, the dither matrix may be generated to provide additional image enhancement techniques.

In described embodiments, the offset value represented an offset in the horizontal direction of the tiled instances of the filtered dither matrix. In an alternative embodiment, the offset value represents and offset in the vertical direction. To determine the wrap around values for a vertical offset, the matrices may be rotated, the filtered threshold values calculated, and then the matrix rotated again.

The integer values m by n used to describe the pixel lengths of the filter region may be equal or different values.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   a printer generating a dither matrix of threshold values; and
   the printer filtering the threshold values in the dither matrix to generate a filtered dither matrix of filtered dither values by:
   determining a region of dither values in the dither matrix that surrounds the value being considered, wherein the dither values in the determined region comprise one of dither values in a first portion of the region within the dither matrix or a wrap around dither value in a second portion of the region that extends beyond the dither matrix;
   using an offset value to determine one wrap around dither value, wherein repeated instances of the dither matrix are designed to be applied to an image by forming a tile pattern of the repeated instances of the matrix over the image pattern, and wherein the repeated instances of the matrix in the tile pattern are offset in one direction by the offset value; and
   performing an operation on the determined dither values in the region to determine a filtered value for the dither value being considered.

2. The method of claim 1, wherein the operation on the determined surrounding dither values comprises determining a weighted average of the dither values in the region surrounding the dither value being considered.

3. The method of claim 2, where said weighted average is determined by a filtering operation such as convolution.

4. The method of claim 3, wherein the region forms one of a rectangle, square or circular shape.

5. The method of claim 1, wherein the region forms a geometric shape and the value being considered lies within the region.

6. The method of claim 1, wherein the value being considered lies in the center of said region.

7. The method of claim 6, wherein the offset value is approximately one half of n.

8. The method of claim 6, wherein said offset value is a positive or negative integer.

9. The method of claim 1, wherein values in the matrix have an (x, y) coordinate position in the matrix such that $1 \leq x \leq m$ and $1 \leq y \leq n$, wherein the wrap around value has an (x, y) coordinate position in the second portion of the region such that $1 > x$ or $x > m$ or $1 > y$ or $y > n$, wherein the (x', y') coordinates in dither matrix providing the wrap around value are calculated by performing an operation on the (x, y) coordinates of the wrap around value using the offset value to determine coordinates (x', y') within the matrix providing the dither value for the wrap around value.

10. The method of claim 9, wherein the offset value is used to determine the y' coordinate in the dither matrix but not the x' coordinate in the dither matrix.

11. The method of claim 10, wherein the value m is used to determine the x' coordinate.

12. The method of claim 9, wherein performing the operation on the (x, y) coordinates to determine the (x', y') coordinates comprises:
   $x' = x \bmod m$, wherein $0 < x' \leq m$; and
   $y' = y'' \bmod n$, where $t = (x-x')/m$, and where $y'' = y - (t * \text{offset value})$.

13. The method of claim 12, further comprising:
   if $0 < x \leq m$, then $x' = x$; and
   if $0 < y \leq n$, then $y' = y$.

14. The article of manufacture of claim 9, wherein values in the matrix have an (x, y) coordinate position in the matrix such that $1 \leq x \leq m$ and $1 \leq y \leq n$, wherein the wrap around value has an (x, y) coordinate position in the second portion of the region such that $1 > x$ or $x > m$ or $1 > y$ or $y > n$, wherein the (x', y') coordinates in dither matrix providing the wrap around value are calculated by performing an operation on the (x, y) coordinates of the wrap around value using the offset value to determine coordinates (x', y') within the matrix providing the dither value for the wrap around value.

15. The system of claim 1, wherein values in the matrix have an (x, y) coordinate position in the matrix such that $1 \leq x \leq m$ and $1 \leq y \leq n$, wherein the wrap around value has an (x, y) coordinate position in the second portion of the region such that $1 > x$ or $x > m$ or $1 > y$ or $y > n$, wherein the (x', y') coordinates in dither matrix providing the wrap around value are calculated by performing an operation on the (x, y) coordinates of the wrap around value using the offset value to determine coordinates (x', y') within the matrix providing the dither value for the wrap around value.

16. The system of claim 15, wherein the offset value is used to determine the y' coordinate in the dither matrix but not the x' coordinate in the dither matrix.

17. The system of claim 16, wherein the value m is used to determine the x' coordinate.

18. The article of manufacture of claim 17, wherein the offset value is used to determine the y' coordinate in the dither matrix but not the x' coordinate in the dither matrix.

19. A system, comprising:
   an integrated circuit, including:
      a matrix generator for generating a dither matrix of threshold values; and
      a dither matrix filter for filtering the threshold values in the dither matrix to generate a filtered dither matrix of filtered dither values by:
      determining a region of dither values in the dither matrix that surrounds the value being considered, wherein the dither values in the determined region comprise one of dither values in a first portion of the region within the dither matrix or a wrap around dither value in a second portion of the region that extends beyond the dither matrix;
      using an offset value to determine one wrap around dither value, wherein repeated instances of the dither matrix are designed to be applied to an image by forming a tile pattern of the repeated instances of the matrix over the image pattern, and wherein the repeated instances of the matrix in the tile pattern are offset in one direction by the offset value; and performing an operation on the determined dither values in the region to determine a filtered value for the dither value being considered.

20. An article of manufacture including code, is stored on a computer readable medium, wherein the code, when executed by a processor causes the processor to perform:

generating a dither matrix of threshold values; and filtering the threshold values in the dither matrix to generate a filtered dither matrix of filtered dither values by:

determining a region of dither values in the dither matrix that surrounds the value being considered, wherein the dither values in the determined region comprise one of dither values in a first portion of the region within the dither matrix or a wrap around dither value in a second portion of the region that extends beyond the dither matrix;

using an offset value to determine one wrap around dither value, wherein repeated instances of the dither matrix are designed to be applied to an image by forming a tile pattern of the repeated instances of the matrix over the image pattern, and wherein the repeated instances of the matrix in the tile pattern are offset in one direction by the offset value; and performing an operation on the determined dither values in the region to determine a filtered value for the dither value being considered.

\* \* \* \* \*

UNITED STATES PATENT AND TRADEMARK OFFICE
CERTIFICATE OF CORRECTION

PATENT NO. : 7,733,533 B2  Page 1 of 1
APPLICATION NO. : 11/278939
DATED : June 8, 2010
INVENTOR(S) : Stanich et al.

It is certified that error appears in the above-identified patent and that said Letters Patent is hereby corrected as shown below:

In column 7, at line 61 delete, "$1\leqq<x.\leqq m$" and insert --$1\leq x.\leq m$--.

In column 7, at line 62 delete, "$1\leqq y\leqq n,$" and insert --$1\leq y\leq n,$--.

In column 8, at line 11 delete, "$0<x'\leqq m;$" and insert --$0<x'\leq m;$--.

In column 8, at line 15 delete, "$0<x\leqq m,$" and insert --$0<x\leq m,$--.

In column 8, at line 16 delete, "$0<y\leqq n,$" and insert --$0<y\leq n,$--.

In column 8, at line 19 delete, "$1\leqq x\leqq m$ and $1\leqq y\leqq n,$" and insert --$1\leq x\leq m$ and $1\leq y\leq n,$--.

In column 8, at line 29 delete, "$1\leqq x\leqq m$ and $1\leqq y\leqq n,$" and insert --$1\leq x\leq m$ and $1\leq y\leq n,$--.

Signed and Sealed this

Third Day of August, 2010

David J. Kappos
*Director of the United States Patent and Trademark Office*